United States Patent
Kao et al.

(10) Patent No.: US 10,479,444 B2
(45) Date of Patent: Nov. 19, 2019

(54) CRANK DRIVE APPARATUS FOR POWER ASSISTED BICYCLE

(71) Applicant: Darfon Electronics Corporation, Taoyuan (TW)

(72) Inventors: Huang-Hsiao Kao, Taoyuan (TW); Fei-Ya Chen, Taichung (TW)

(73) Assignee: DARFON ELECTRONICS CORP., Toayuan (TW)

( * ) Notice: Subject to any disclaimer, the term of this patent is extended or adjusted under 35 U.S.C. 154(b) by 198 days.

(21) Appl. No.: 15/703,620

(22) Filed: Sep. 13, 2017

(65) Prior Publication Data

US 2018/0072376 A1 Mar. 15, 2018

(30) Foreign Application Priority Data

Sep. 14, 2016 (TW) .............................. 105129993 A

(51) Int. Cl.
  *B62M 6/50* (2010.01)
  *B62M 6/55* (2010.01)
  *G01L 3/14* (2006.01)

(52) U.S. Cl.
  CPC ............. *B62M 6/50* (2013.01); *B62M 6/55* (2013.01); *G01L 3/1428* (2013.01)

(58) Field of Classification Search
  CPC .......... B62M 6/50; B62M 6/55; G01L 3/1428
  See application file for complete search history.

(56) References Cited

U.S. PATENT DOCUMENTS

| 4,865,143 | A   |   | 9/1989  | Hashimoto et al. |
|-----------|-----|---|---------|------------------|
| 5,014,560 | A   | * | 5/1991  | Hutchison ............. G01L 3/1421 250/231.1 |
| 7,520,179 | B2  | * | 4/2009  | Bernstein ................ G01L 1/165 73/801 |
| 8,117,923 | B2  |   | 2/2012  | Sasaki |
| 8,485,050 | B2  | * | 7/2013  | Yao ........................ G01L 3/1421 73/862.08 |
| 8,646,560 | B2  | * | 2/2014  | Chan ........................ B62M 6/50 180/206.3 |
| 9,488,539 | B2  | * | 11/2016 | Morollon ................ G01L 3/108 |

(Continued)

FOREIGN PATENT DOCUMENTS

| CN | 2401448 Y | 10/2000 |
|----|-----------|---------|
| CN | 2542551 Y | 4/2003  |
| CN | 2675543 Y | 2/2005  |

(Continued)

*Primary Examiner* — Kevin Hurley
(74) *Attorney, Agent, or Firm* — Patterson + Sheridan, LLP

(57) ABSTRACT

A power transmission apparatus includes a shaft, a driving plate, a first driven plate, and a sensor device. The driving plate is disposed on the shaft and rotates with the shaft. The driving plate includes a first block that has a driving surface on it. The first driven plate is disposed on the shaft and capable of moving along the shaft. The first driven plate includes a second block that has a driven surface corresponding to the driving surface. The sensor device is disposed close to the first driven plate for detecting the movement of the first driven plate along the shaft. When the shaft rotates together with the driving plate, the driving surface compels the driven surface to rotate and simultaneously move away from the driving plate along the shaft, and the movement along the shaft is detected by the sensor device.

20 Claims, 15 Drawing Sheets

(56) References Cited

U.S. PATENT DOCUMENTS

| | | | | |
|---|---|---|---|---|
| 10,312,775 | B2* | 6/2019 | Wang | H02K 11/24 |
| 2012/0234108 | A1* | 9/2012 | Janecek | B62M 6/50 |
| | | | | 73/862.338 |

FOREIGN PATENT DOCUMENTS

| | | | |
|---|---|---|---|
| CN | 203902776 U | | 10/2014 |
| TW | 200808611 A | | 2/2008 |
| TW | I613121 B | * | 2/2018 |
| WO | 2013/097733 A1 | | 7/2013 |

\* cited by examiner

CRANK DRIVE APPARATUS FOR POWER ASSISTED BICYCLE

RELATED APPLICATIONS

This application claims priority to Taiwan Application Serial Number 105129993, filed Sep. 14, 2016, which is herein incorporated by reference.

BACKGROUND

1. Field of the Disclosure

This disclosure generally relates to a power transmission apparatus. Particularly, the disclosure relates to a power transmission apparatus applied to a human power driving vehicle.

2. Description of the Prior Art

Human power driving vehicles, such as bicycles and tricycles, are widely used in transportation systems all over the world for a long time. Human power driving vehicles are also usually used in entertainment and sport competitions. In certain usages of human power driving vehicles, auxiliary power may be equipped depending on the conditions to provide additional propelling forces, so that the required human power may be reduced.

Taking a typical bicycle as an example, the bicycle may be equipped with a battery and an electric motor to provide an additional propelling force, so as to be more suitable for transportation or to meet the requirements of certain groups. However, a balance between human power and auxiliary power should be considered to avoid having the bicycle overly dependent on auxiliary power and becoming a fully motor-powered vehicle. Thus, in the design of the vehicle, it is necessary to consider the timing for providing auxiliary power to propel the bicycle and the magnitude of the auxiliary power.

In a typical design, the timing for providing auxiliary power and the magnitude of the auxiliary power can be determined comprehensively according to pedaling speed, slope degree, and the speed of the bicycle, etc. Additionally, in certain designs, a torque measuring mechanism is disposed in the power transmitting system to measure the torque caused by pedaling, so as to determine the timing for providing the auxiliary power and the magnitude of the auxiliary power. However, in the traditional torque measuring mechanism, in addition to the power transmitting components, extra components are required for measuring the torque. These designs often result in power loss and inaccurate torque measurement.

SUMMARY

One objective of one embodiment of the disclosure is providing a power transmission apparatus to measure the torque on the power transmission shaft.

Another objective of one embodiment of the disclosure is providing a power transmission apparatus to reduce power loss resulted in measuring the torque on the power transmission shaft.

In one embodiment of the present disclosure, the power transmission apparatus can be applied to a human power driving vehicle with an auxiliary power. The power transmission apparatus includes a shaft, a propelling plate, a first driven plate, and a sensor device. The propelling plate is disposed on the shaft, perpendicular to an axial direction of the shaft, and rotates together with the shaft. The driving plate has a first surface and at least one first block disposed on the first surface, in which the first block has a propelling surface. The first driven plate is disposed on the shaft and capable of moving along the axial direction of the shaft. The first driven plate has a second surface opposite to the first surface and at least one second block disposed on the second surface, in which the second block has a driven surface, and the driven surface is at least partially opposite to the propelling surface. The sensor device is disposed outside the shaft and close to the first driven plate, in which the sensor device detects a distance between the sensor device and the second surface.

An acting force generated by a contact between the propelling surface and the driven surface has force components both on a tangential direction of a rotation of the shaft and the axial direction of the shaft. When the propelling plate does not rotate around the axial direction of the shaft, a first distance is revealed between the sensor device and the second surface. When the propelling plate rotates around the axial direction of the shaft, the propelling surface compels the driven surface to make the first driven plate correspondingly rotate and simultaneously move away from the propelling plate along the axial direction of the shaft to reveal a second distance between the sensor device and the second surface, and the first distance is different from the second distance.

When the second distance different from the first distance is detected by the sensor device, the sensor device calculates the present torque on the shaft, a correspondingly output voltage, or another physical signal. Based on the present torque on the shaft, the correspondingly output voltage, or the physical signal, whether to provide the auxiliary power (via the shaft or not) to the bicycle can be determined.

DETAILED DESCRIPTION OF THE PREFERRED EMBODIMENT

The present disclosure is related to a power transmission apparatus. In one embodiment of the present disclosure, the power transmission apparatus is applied to a vehicle, especially a human power driving vehicle, such as a human power driving bicycle with an auxiliary power, a human power driving tricycle with an auxiliary power, or another human power driving vehicle requiring an auxiliary power.

Figure 1:
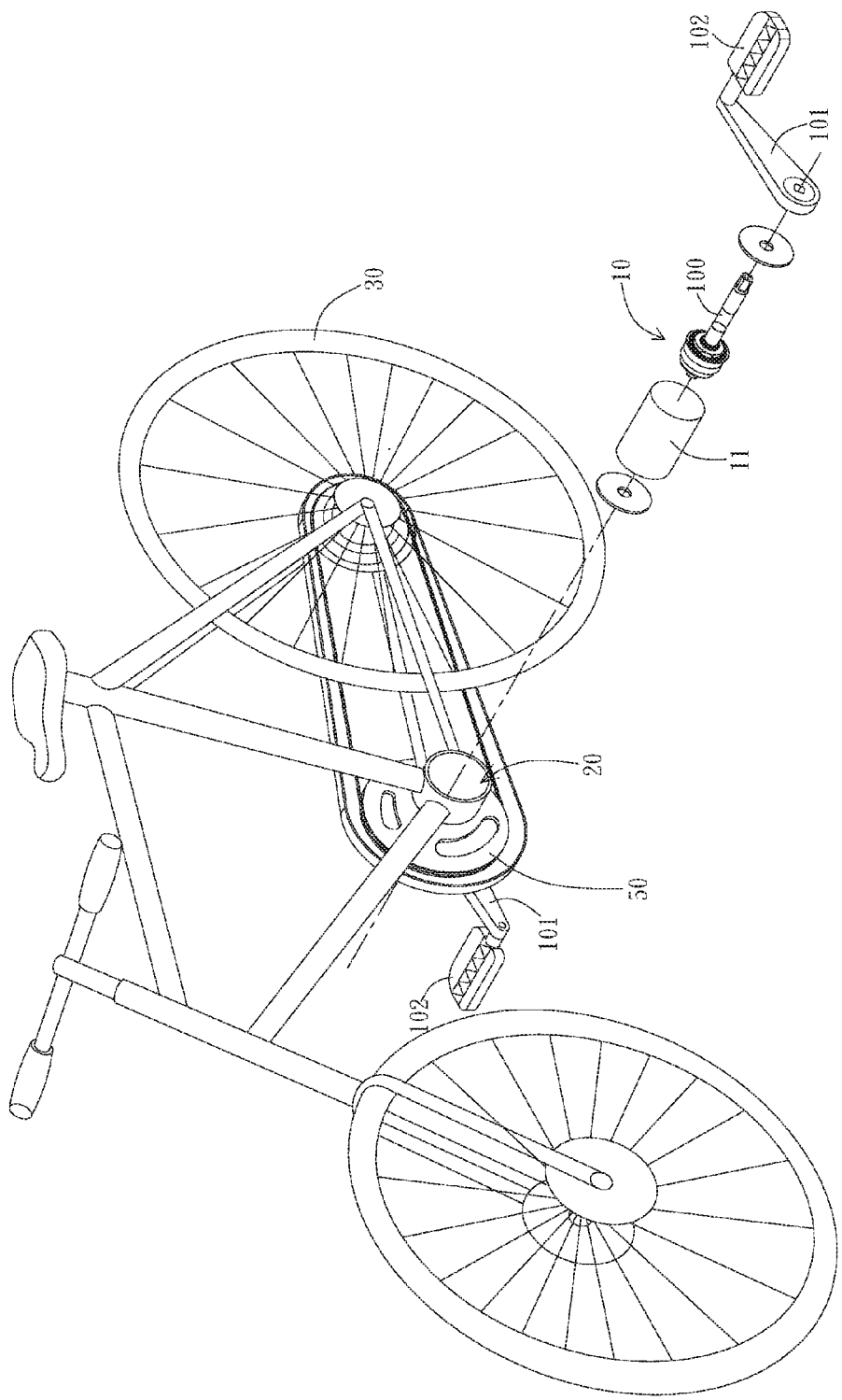
FIG. 1 illustrates a human power driving vehicle using a power transmission apparatus in accordance with one embodiment of the present disclosure.

Referring to FIG. 1, the power transmission apparatus 10 can be applied to a human power driving bicycle with an auxiliary power, and disposed in a bottom bracket housing. The power transmission apparatus 10 has a housing 11 and a shaft 100, and the shaft 100 is disposed within the housing 11. The ends of the shaft 100 separately connect to cranks 101, and the cranks 101 connect to pedals 102. The pedals 102 are configured to be ridden by a user, so that wheels 30 of the bicycle can be propelled via a chainwheel 50 connected to the power transmission apparatus 10. However, in another embodiment, the power transmission apparatus 10 propels the wheels 30 via a gear set and a worm screw or in another manner. Additionally, the chainwheel 50 may be connected to a power source (not shown) and driven by the power source to further drive the wheels 30 to rotate. In one embodiment, the power source can be, but not limited to, an electric motor. In one embodiment, the power source transmits power to the chainwheel 50 or directly to the wheels 30 via a gear set, a worm screw, a strap, chains, other mechanisms, or any combination thereof.

Figure 2A:
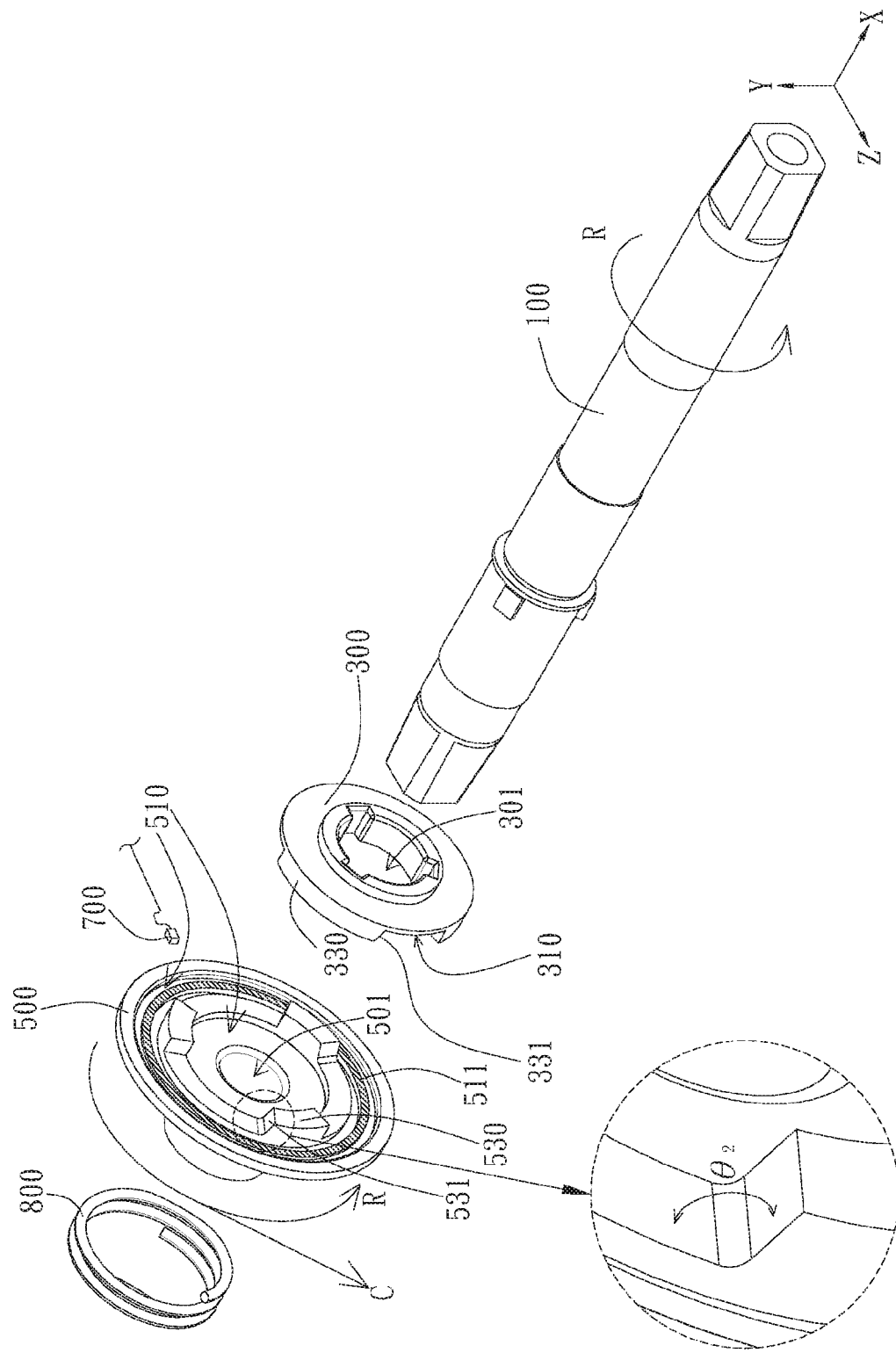
FIGS. 2A and 2B are exploded diagrams of the power transmission apparatus in accordance with one embodiment of the present disclosure.
Figure 2B:
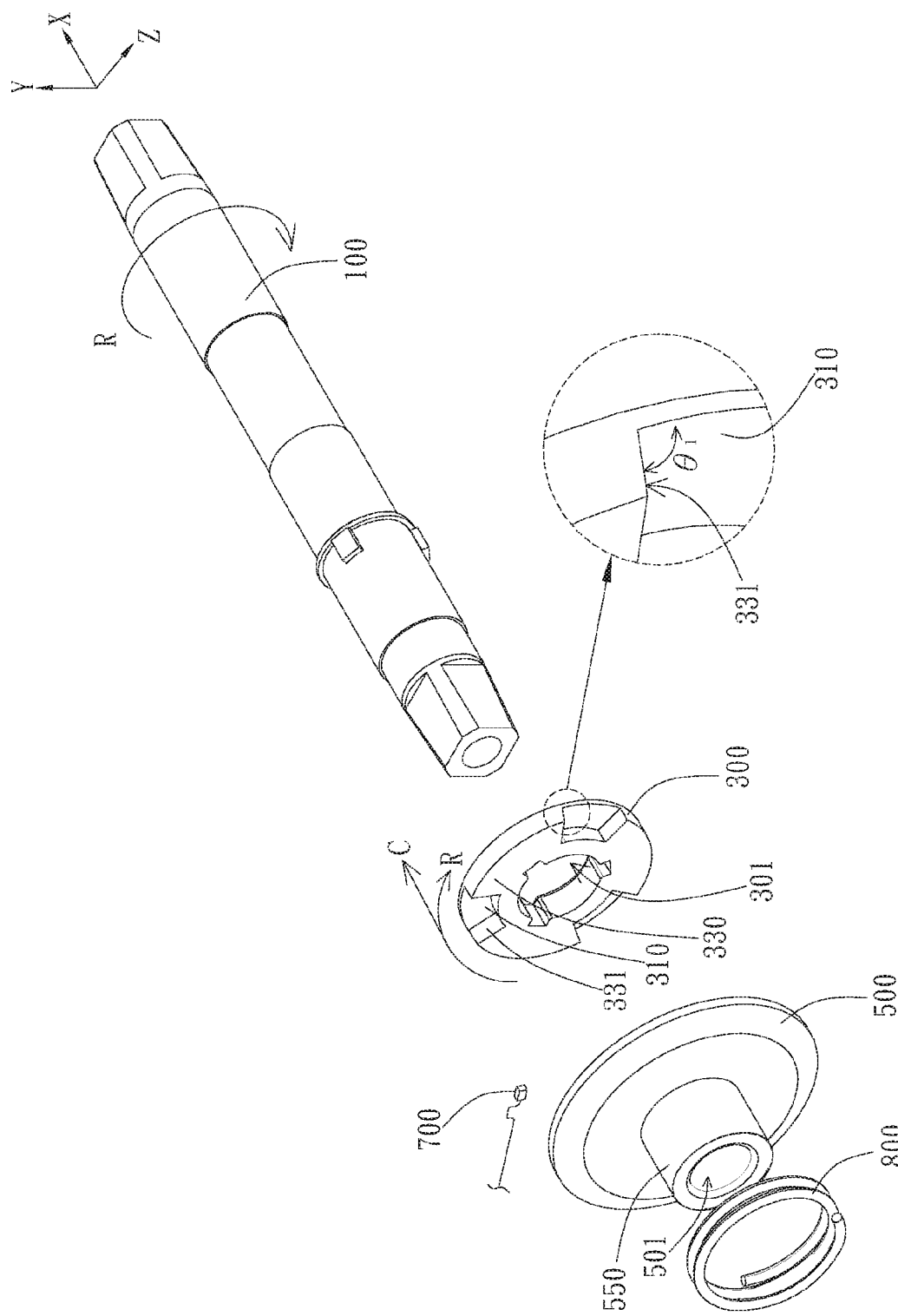

In one embodiment illustrated in FIGS. 2A and 2B, in addition to the shaft 100, the power transmission apparatus 10 further includes a propelling plate 300, a first driven plate 500, and a sensor device 700. The extension direction or the axial direction of the shaft 100 is labeled as X axis and the shaft 100 is capable of rotating around the X axis with a rotational direction R. The propelling plate 300 is disposed on the shaft 100. In one embodiment, the propelling plate 300 is perpendicular to the axial direction of the shaft 100. In one embodiment, the center portion of the propelling plate 300 has a hole 301 that allows the shaft 100 to pass through. The shaft 100 is engaged with the inner wall of the hole 301, so as to allow the propelling plate 300 to rotate together with the shaft 100 around X axis. As illustrated in FIGS. 2A and 2B, the propelling plate 300 has a first surface 310. In one embodiment, the first surface 310 is perpendicular to the shaft 100, and the hole 301 is located at the center portion of the first surface 310. In addition, there are Y axis and Z axis in FIGS. 2A and 2B. X axis, Y axis, and Z axis are perpendicular to each other. In one embodiment, the first surface 310 is substantially parallel to a plane form by Y axis and Z axis. That is, when the propelling plate 300 rotates around X axis, the plane of rotation is parallel to the plane form by Y axis and Z axis.

At least one first block 330 is disposed on the first surface 310. The quantity of the first block 330 can be multiple. For example, in one embodiment illustrated in FIGS. 2A and 2B, three first blocks 330 are disposed on the first surface 310 and arranged with a ring shape centered at the shaft 100. In one embodiment, the distances between each of the three first blocks 330 and the shaft 100 are identical, but the present disclosure is not limited in this regard. As illustrated in FIGS. 2A and 2B, the propelling surface 331 crosses a rotational direction of the shaft 100. In other words, the propelling surface 331 stands on the first surface 310, and a tangential direction of a rotation of the location of the propelling surface 331 passes through the propelling surface 331. In one embodiment, an angle $\theta_1$ between the propelling surface 331 and the first surface 310 is greater than 90 degree, but the propelling surface 331 may also be perpendicular to the first surface 310.

The first driven plate 500 is disposed on the shaft 100 and inserted by the shaft 100, and capable of moving along the axial direction of the shaft 100. As illustrated in FIGS. 2A and 2B, in one embodiment, the center portion of the first driven plate 500 has a hole 501 for the shaft 100 passing through, so as to allow the first driven plate 500 to move along X axis relative to the shaft 100. In one embodiment, the first driven plate 500 is perpendicular to the shaft 100 and parallel to the propelling plate 300. Since the propelling plate 300 is fixed on the shaft 100, when the first driven plate 500 moves along X axis relative to the shaft 100, the first driven plate 500 approaches to the propelling plate 300 or leaves away from the propelling plate 300. The first driven plate 500 has a second surface 510 facing the first surface 310. In one embodiment, the second surface 510 perpendicular to the shaft 100, and the hole 501 is located at the center region of the second surface 510.

At least one second block 530 is disposed on the second surface 510. The quantity of the second block 530 can be multiple. For example, in one embodiment illustrated in FIGS. 2A and 2B, three second blocks 530 are disposed on the second surface 510 and arranged with a ring shape centered at the shaft 100. In one embodiment, the distances between each of the three second blocks 530 and the shaft 100 are identical, but the present disclosure is not limited in this regard. Each of the first blocks 330 is inserted between two adjacent one of the second blocks 530. That is, each of the second blocks 530 is inserted between two adjacent one of the first blocks 330. Through such a configuration, power loss in power transmission can be reduced, and the torque generated by the rotation of the shaft 100 can be more uniformly distributed to the propelling plate 300 and the first driven plate 500.

The second block 530 has a driven surface 531. The driven surface 531 is opposite to the propelling surface 331 on the first block 330, and at least partially touches against the propelling surface 331 directly or indirectly. When the propelling plate 300 rotates together with the shaft 100, the first block 330 drives the second block 530 to move via the direct or indirect contact between the propelling surface 331 and the driven surface 531, so as to make the first driven plate 500 (1) rotate around X axis along the direction R and (2) move toward a negative X axis direction to leave away from the propelling plate 300 for a certain distance. The driven surface 531 crosses the rotational direction R of the shaft 100. As illustrated in FIGS. 2A and 2B, the arrow indicating the rotational direction R is cut by a plane extended from the driven surface 531. In another aspect of view, the driven surface 531 stands on the second surface 510, and as illustrated in FIGS. 2A and 2B, the rotational direction R has a tangential direction C at the positon that the rotational direction R passing through the driven surface 531. In one embodiment, an angle $\theta_2$ between the driven surface 531 and the second surface 510 is greater than 90 degree, but the driven surface 531 may also be perpendicular to the second surface 510. In addition, in one embodiment, the driven surface 531 is parallel to the propelling surface 331, but the present disclosure is not limited in this regard.

As illustrated in FIGS. 2A and 2B, the sensor device 700 is disposed at a position adjacent to the first driven plate 500 to sense a moving distance of the first driven plate 500 along X axis. In this embodiment, the sensor device 700 is disposed opposite to the second surface 510 to continuously detect a distance between the sensor device 700 and the second surface 510, so as to acquire the moving distance of the first driven plate 500 along X axis. In one embodiment, the sensor device 700 can be disposed on the housing 11 (shown in FIG. 1) of the power transmission apparatus 10. In this embodiment, the sensor device 700 does not rotate together with the propelling plate 300 and the first driven plate 500. However, in another embodiment, the sensor device 700 may be disposed on the propelling plate 300 and rotates together with the propelling plate 300.

In one embodiment, the sensor device 700 is a magnetic sensor, such as a hall sensor, which acquires a change of a distance by detecting a variation of an exterior magnetic field and converting it into a variation of an output voltage. As illustrated in FIG. 2A, a magnetic region 511 is disposed on the second surface 510, and the sensor device 700 disposed corresponding to the magnetic region 511 to sense a magnetic field generated by the magnetic region 511. For example, on a direction parallel to X axis, the sensor device 700 and at least a portion of the magnetic region 511 are collinear, or projections thereof are at least partially overlaps to each other. In one embodiment, the magnetic region 511 is symmetrically disposed on the second surface 510 with a ring shape centered at the shaft 100. For example, the magnetic region 511 can be a continuous ring and centered at the shaft 100. As another example, the magnetic region 511 can be a plurality of magnetic region segments distributed with a ring shape and centered at the shaft 100. In such a configuration, when the first driven plate 500 rotates, the sensor device 700 can continuously or periodically detect a variation of an intensity of the magnetic field caused by the magnetic region 511 moving along the axial direction of the shaft 100. Therefore, when the first driven plate 500 rotates around X axis, if the sensor device 700 does not rotate correspondingly, such as the sensor device 700 being disposed on the housing 11, different portions of the magnetic region 511 can be opposite to the sensor device 700, so that the sensor device 700 is allowed to continuously or periodically detect a variation of the intensity of the magnetic field caused by the magnetic region 511 moving along the axial direction of the shaft 100, and through a conversion, a variation of the distance between the sensor device 700 and the second surface 510 can be continuously acquired. In a different embodiment, the sensor device 700 is not limited to a magnetic sensor, and can be another sensor capable of detecting a variation of distance by using optic principles, electric principles, or other principles.

In one embodiment, the ring shape magnetic region 511 may have a radius substantially equal to r, and the sensor device 700 may be disposed at a position with a distance equal to r from the shaft 100.

As illustrated in FIGS. 2A and 2B, the power transmission apparatus 10 further includes a resilient member 800 connected to the first driven plate 500, providing a restoring force along a positive X axis direction to the first driven plate 500 to drive the first driven plate 500 to move along the positive X axis direction to approach the propelling plate 300. In this embodiment, the resilient member 800 is a helical spring inserted by the shaft 100 and positioned at a side of the first driven plate 500 opposite to the propelling plate 300. In this embodiment, the resilient member 800 applies the restoring force as a pushing force to the first driven plate 500 to push the first driven plate 500 to move toward the propelling plate 300. In a different embodiment, the resilient member 800 is not limited to the helical spring and can be disposed at a different position, and the restoring force applied to the first driven plate 500 may be a pulling force on a basis of the different type and the different position of the resilient member 800. The resilient member 800 may also be connected to the shaft 100, the housing 11 (as shown in FIG. 1), or another component, to receive an appropriate counteraction force for supporting.

Figure 3A:
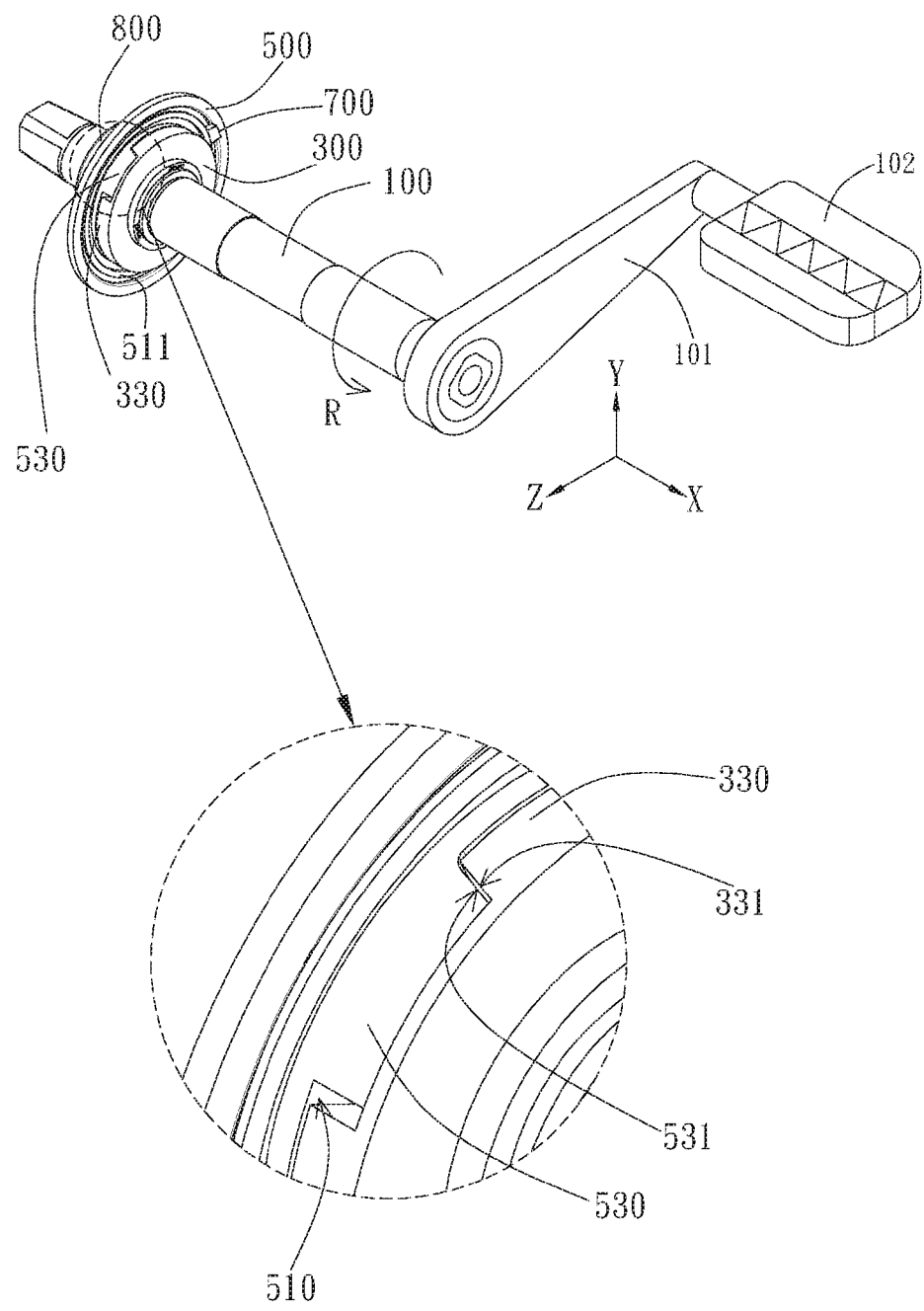
FIGS. 3A and 3B illustrate the power transmission apparatus before the shaft drives the propelling plate to rotate in accordance with one embodiment of the present disclosure.
Figure 3B:
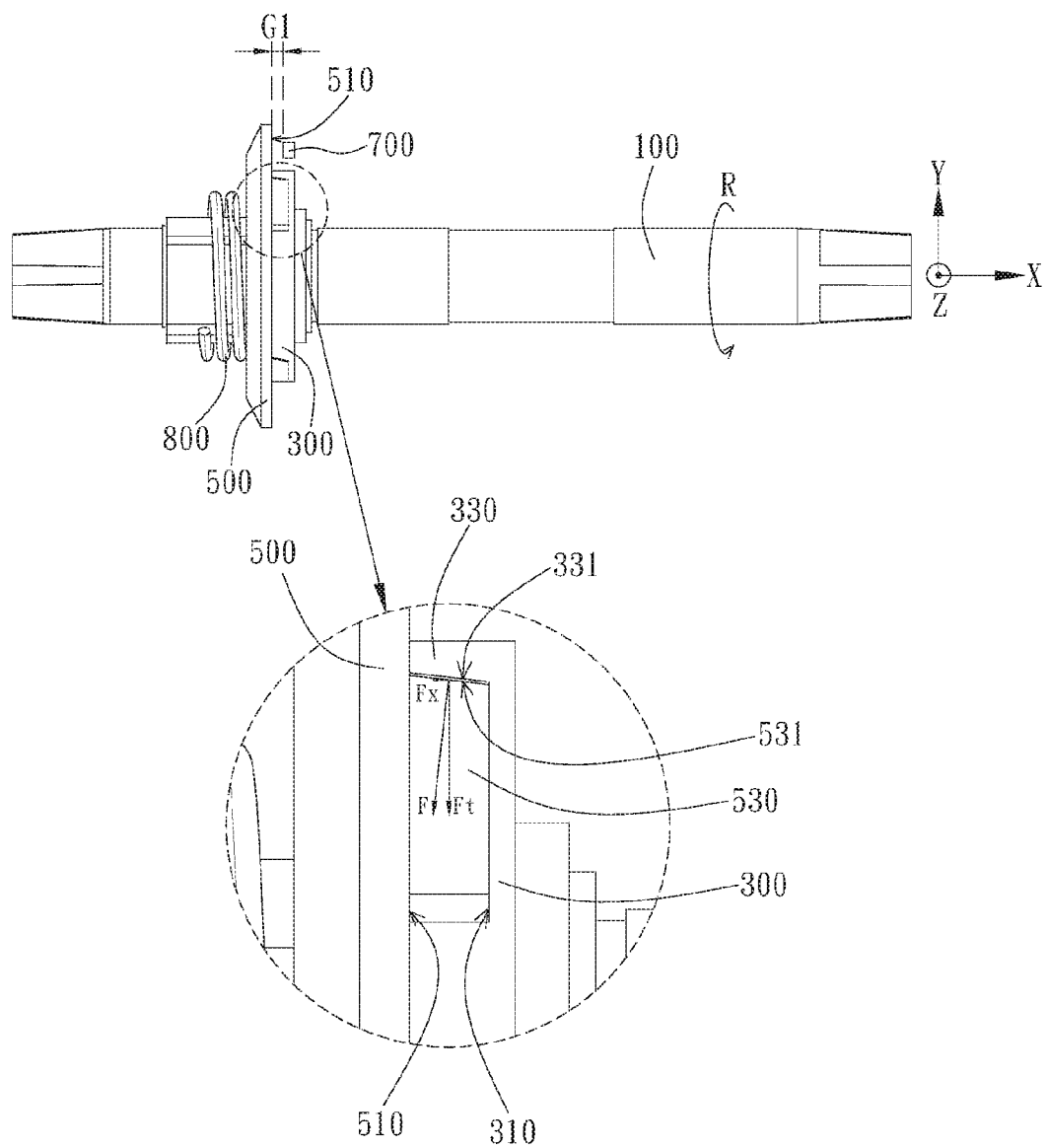

As illustrated in FIGS. 3A and 3B, when the shaft 100 does not drive the propelling plate 300 to rotate, the resilient member 800 applies a force to the first driven plate 500 to drive the first driven plate 500 to move along the positive X axis direction to approach the propelling plate 300, so that the first block 330 inserts more into a gap between two adjacent second blocks 530, and the propelling surface 331 touches against the driven surface 531 with a larger area. At this time, since the first driven plate 500 merely receives a force from the resilient member 800, a force caused by the contact between the propelling surface 331 and the driven surface 531 is relatively small, and may be even close to 0. Additionally, in one different embodiment, when the shaft 100 does not drive the propelling plate 300 to rotate, the propelling surface 331 does not touch against the driven surface 531, and a slit therefore exists therebetween until the propelling plate 300 rotates and the propelling surface 331 touches against the driven surface 531.

When the shaft 100 does not drive the propelling plate 300 to rotate, a first distance G1 exists between the sensor device 700 and the first driven plate 500. In this embodiment, as illustrated in FIGS. 3A and 3B, the sensor device 700 measures a distance between the sensor device 700 and the second surface 510, so that the first distance G1 may indicate a distance between the sensor device 700 and the second surface 510 in the direction parallel to X axis (i.e., the axial direction of the shaft 100). However, in a different embodiment, the first distance G1 may indicate a linear distance between the sensor device 700 and the second surface 510.

Figure 4A:
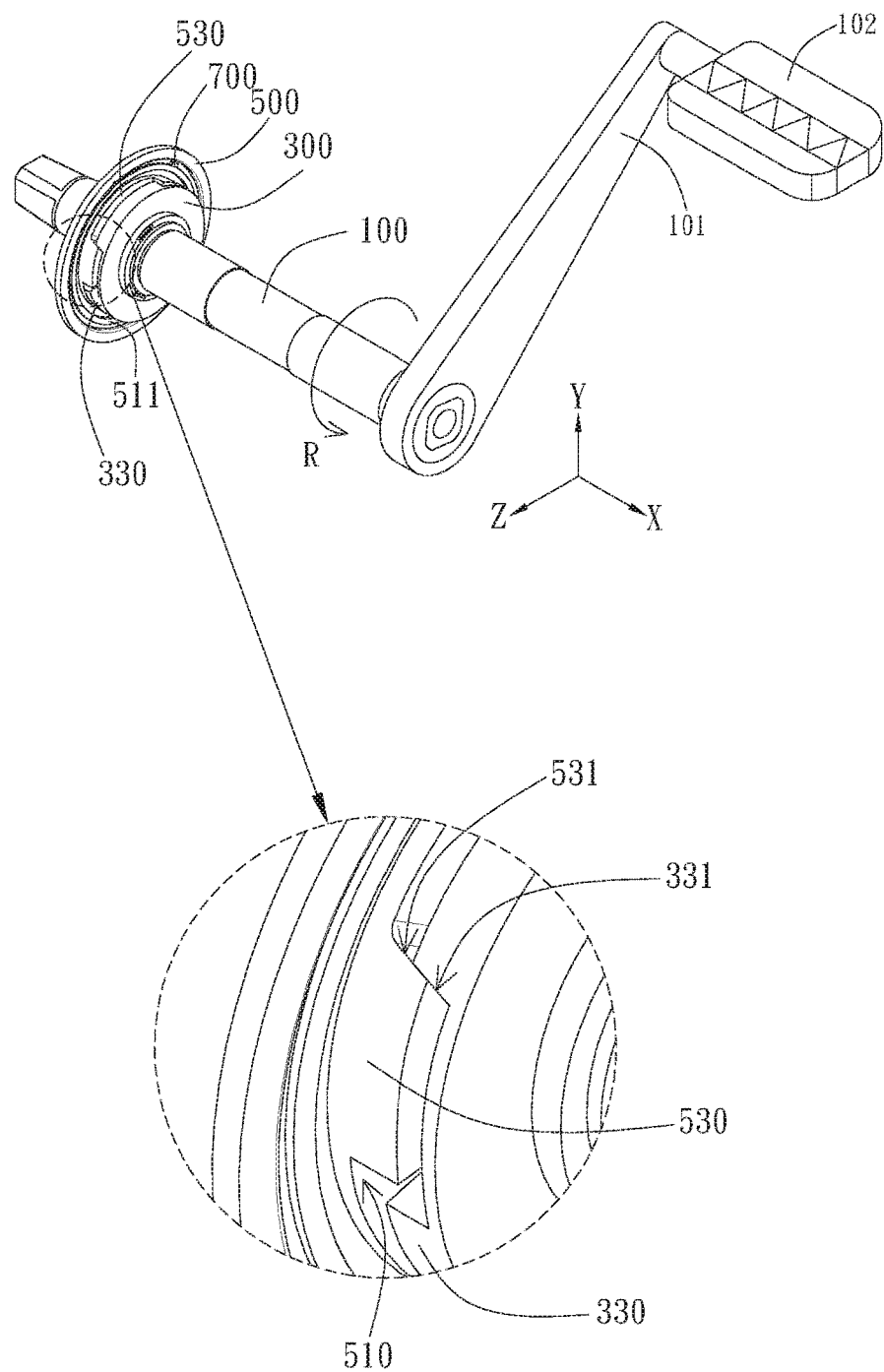
FIGS. 4A and 4B illustrate the power transmission apparatus after the shaft drives the propelling plate to rotate in accordance with one embodiment of the present disclosure.
Figure 4B:
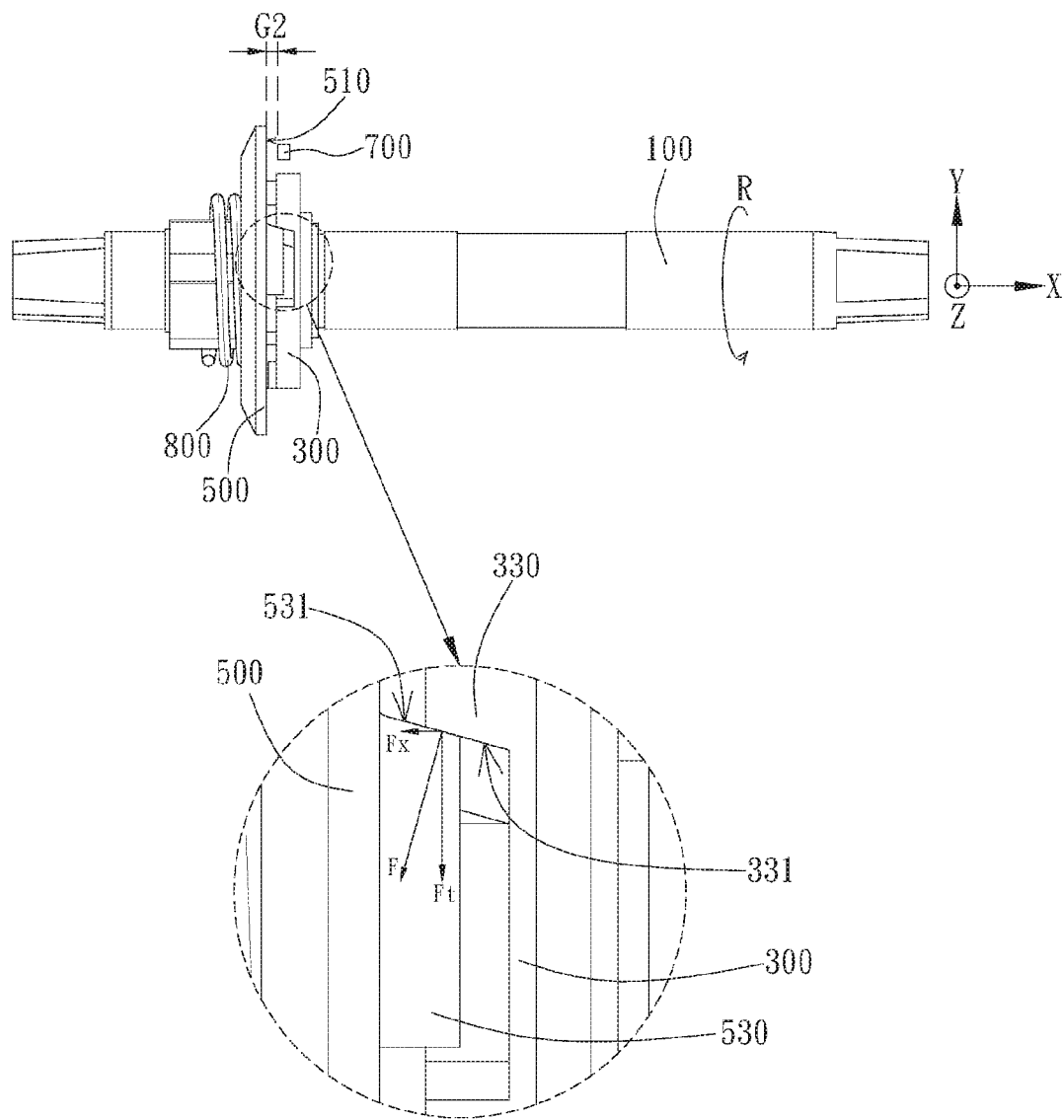

When a rider drives the pedals 102 to apply a pedaling force to the shaft 100 to drive the propelling plate 300 to rotate, as illustrated in FIGS. 4A and 4B, the propelling surface 331 of the first block 330 compels the driven surface 531 of the second block to drive the first driven plate 500 to rotate correspondingly. When the propelling surface 331 pushes the driven surface 531, an acting force F is applied to the driven surface 531. Since there is an included angle existed between a direction of the acting force F and a tangential direction of the rotation of the shaft 100, the acting force F has a force component Fx in the axial direction of the shaft 100 and a force component Ft in the tangential direction of the rotation of the shaft 100. The force component Fx is parallel to the X axis and can be regarded as a force component of the acting force F on the X axis. The force component Ft drives the second block 530 and the first driven plate 500 to rotate concurrently. The force component Fx drives the second block 530 and the first driven plate 500 to move along the X axis. In one embodiment, the force component Fx drives the second block 530 and the first driven plate 500 to leave away from the propelling plate 300 and the first surface 310. At this time, the distance between the sensor device 700 and the first driven plate 500 become a second distance G2 different from the first distance G1. In one embodiment that both of the sensor device 700 and the propelling plate 300 are disposed at a same side of the first driven plate 500 (e.g., a side corresponding to the second surface 510) and the sensor device 700 measures a distance relative to the second surface 510, the second distance G2 may be longer than the first distance G1. However, in another embodiment that the sensor device 700 is disposed at another side of the first driven plate 500 that opposite to the propelling plate 300 or the sensor device 700 measures a distance relative to another portion of the first driven plate 500, the second distance G2 may be shorter than the first distance G1.

When the sensor device 700 measures the second distance G2, which is different from the first distance G1, a present torque on the shaft 100, a corresponding output voltage, or other physical quantities may be calculated. Based on the present torque on the shaft 100, the corresponding output voltage, or other physical quantities, a processing device disposed at the bicycle, the auxiliary power source, a plug-in module, or another position can utilize hardware or software to determine whether to provide the auxiliary power (via the shaft 100 or not) to the bicycle. Additionally, the present torque on the shaft 100, the corresponding output voltage, or other physical quantities may be utilized for other purposes, such as to serve as training records of athletes. In these embodiments, since the propelling plate 300 and the first driven plate 500 are power transmission components in the power transmission path, and the propelling plate 300 that is closer to the power source is used as an active component to drive the first driven plate 500, the measurement of the torque can be more accurate, and the power loss can be reduced.

When the first driven plate 500 moves to leave away from the propelling plate 300, as illustrated in FIG. 4B, the first driven plate 500 compresses the resilient member 800 to accumulate elastic potential energy. When the rider stop pedaling, the torque applied on the propelling plate 300 decreases or vanishes accordingly, the elastic potential energy accumulated in the resilient member 800 converts into a restoring force applying to the first driven plate 500 to drive the first driven plate 500 to move with a direction to return to its original position.

As illustrated in FIG. 4B, the propelling surface 331 and the driven surface 531 are tilted relative to a virtual cross section perpendicular to the shaft 100. Since the virtual cross section is parallel to the Y axis and the Z axis, the propelling surface 331 and the driven surface 531 cross the plane formed by the Y axis and the Z axis. Since the acting force F applied by the propelling surface 331 is perpendicular to the driven surface 531 and the driven surface 531 is tilted, the acting force F has the force component Fx in the axial direction of the shaft 100 and the force component Ft in the tangential direction of the rotation of the shaft 100. As described above, the force component Fx pushes the first driven plate 500 to move along the X axis. In a different embodiment, merely one of the propelling surface 331 and the driven surface 531 is tilted. That is, merely the propelling surface 331 is tilted or merely the propelling surface 331 is tilted. In one embodiment that the propelling surface 331 is tilted and the driven surface 531 is formed perpendicularly, when a contact point is drop on the driven surface 531, the aforementioned force component Fx can be generated to push the first driven plate 500 to move along the X axis.

Figure 5:
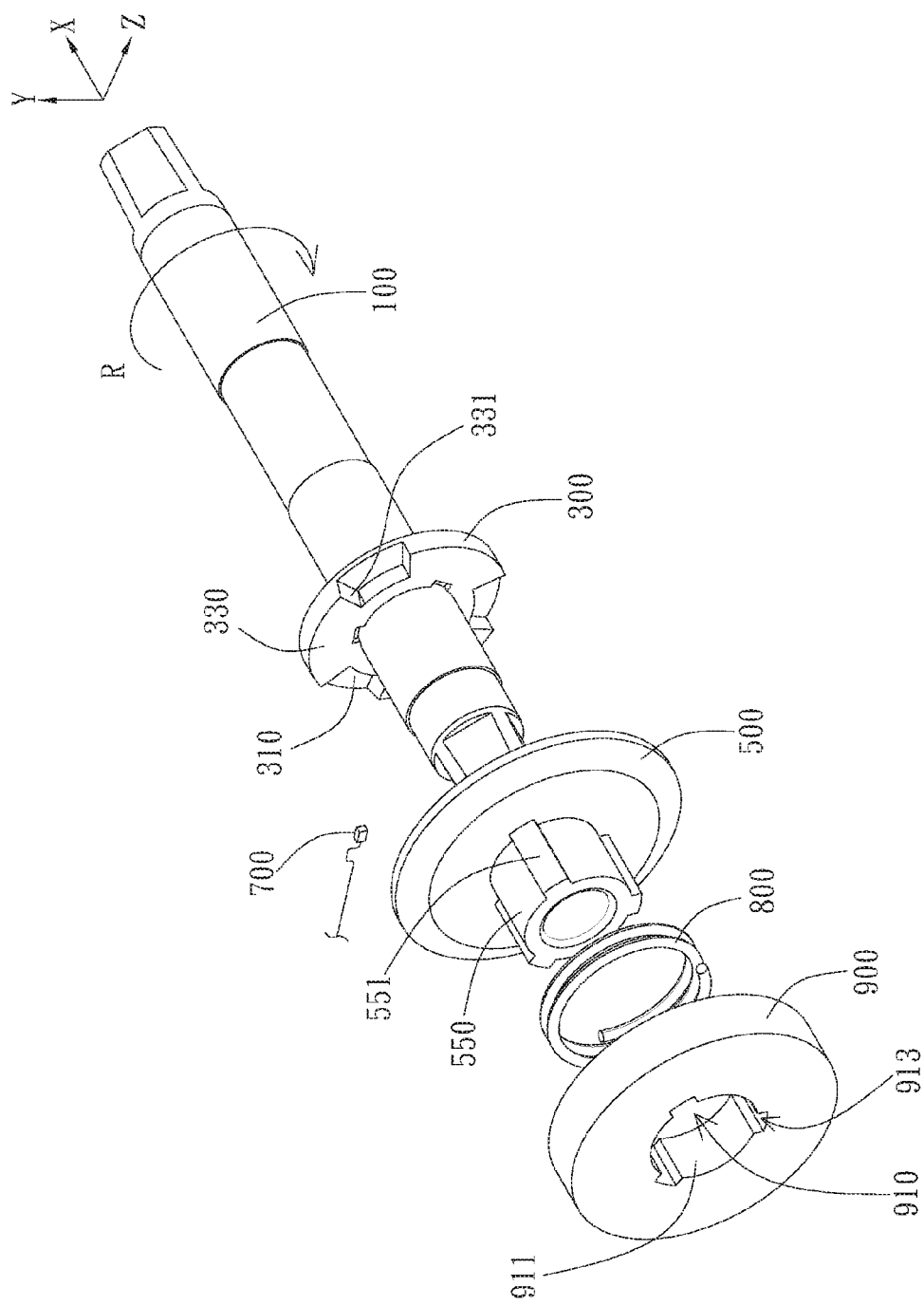
FIG. 5 is an exploded diagram of a power transmission apparatus in accordance with another embodiment of the present disclosure.

In one embodiment illustrated in FIG. 5, the power transmission apparatus 10 further includes a second driven plate 900. The second driven plate 900 is disposed on the shaft 100 and inserted by the shaft 100, and disposed at a side of the first driven plate 500 opposite to the propelling plate 300. The second driven plate 900 is coupled to the wheels 30, so as to drive the wheels 30 to rotate by the rotation of the second driven plate 900. In one embodiment, the second driven plate 900 can be coupled to the wheels 30 via a gear set, a worm screw, a strap, chains, other mechanisms, or any combination thereof, so as to drive the wheels 30 to rotate. In one embodiment, the second driven plate 900 is fixed relative to the shaft 100 in the axial direction of the shaft 100 and is unmovable. As illustrated in FIG. 5, the resilient member 800 is disposed between the first driven plate 500 and the second driven plate 900, so as to provide the restoring force to the first driven plate 500 by taking the second driven plate 900 as a support. More specifically, in an embodiment that the resilient member 800 is a helical spring, two ends of the helical spring separately touch against the first driven plate 500 and the second driven plate 900.

The second driven plate 900 is driven by the first driven plate 500 to rotate around the X axis. In another aspect, the second driven plate 900 drives the first driven plate 500 to rotate around the X axis. As illustrated in FIG. 5, the first driven plate 500 has a tube portion 550 extending out toward the second driven plate 900. The tube portion 550 and the second surface 510 are separately located at two opposite sides of the first driven plate 500. The tube portion 550 has at least one protruding portion 551 thereon protruding along a radial direction of the shaft 100. In one embodiment, the protruding portion 551 extends along the radial direction of the shaft 100 and the X axis. The second driven plate 900 has a hole 910 thereon to be inserted by the tube portion 550. The hole 910 is formed and surrounded by an inner wall 911. At least one guide groove 913 extended along the axial direction of the shaft 100 and the X axis is formed on the inner wall 911. The protruding portion 551 is contained in the guide groove 913 and movable along the guide groove 913. That is, the association between the protruding portion 551 and the guide groove 913 guides the relative movement between the first driven plate 500 and the second driven plate 900, and the protruding portion 551 and the guide groove 913 are also taken as a part of the power transmission mechanism when the first driven plate 500 and the second driven plate 900 rotate coordinately. Additionally, a plurality of the protruding portions 551 and the guide grooves 913 may be evenly disposed around X axis, so as to enhance the efficiency of force transmission and the balance of force distribution.

In this embodiment, the second driven plate 900 can be disposed merely for serving as a support of the resilient member 800. However, in different embodiments, the second driven plate 900 can coordinate with other power transmission components for transmitting power. For example, a clutch or a pawl may be disposed on the outer periphery of the second driven plate 900 to be engaged with a gear which provides power, so that the second driven plate 900 is able to receive the power from the power source, and transmit the power to the chainweel 50 via the shaft 100 and transmit the power to the wheels 30.

Figure 6A:
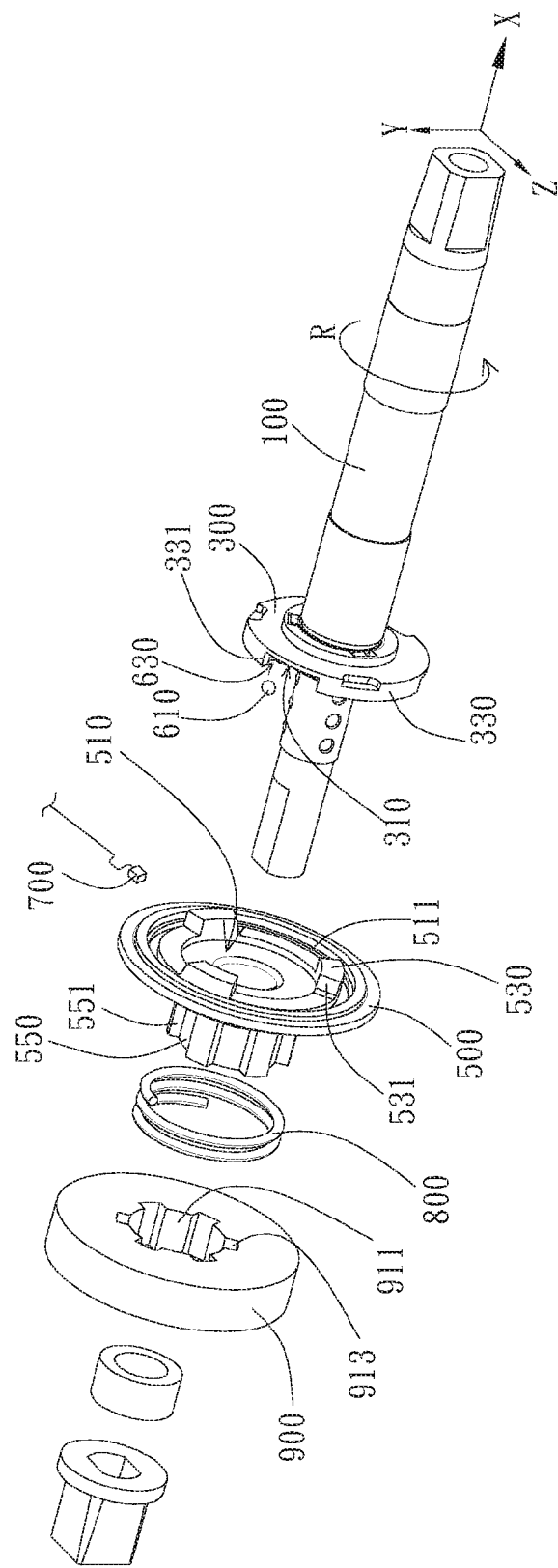
FIG. 6A and 6B are exploded diagrams of a power transmission apparatus with a second driven plate in accordance with one embodiment of the present disclosure.
Figure 6B:
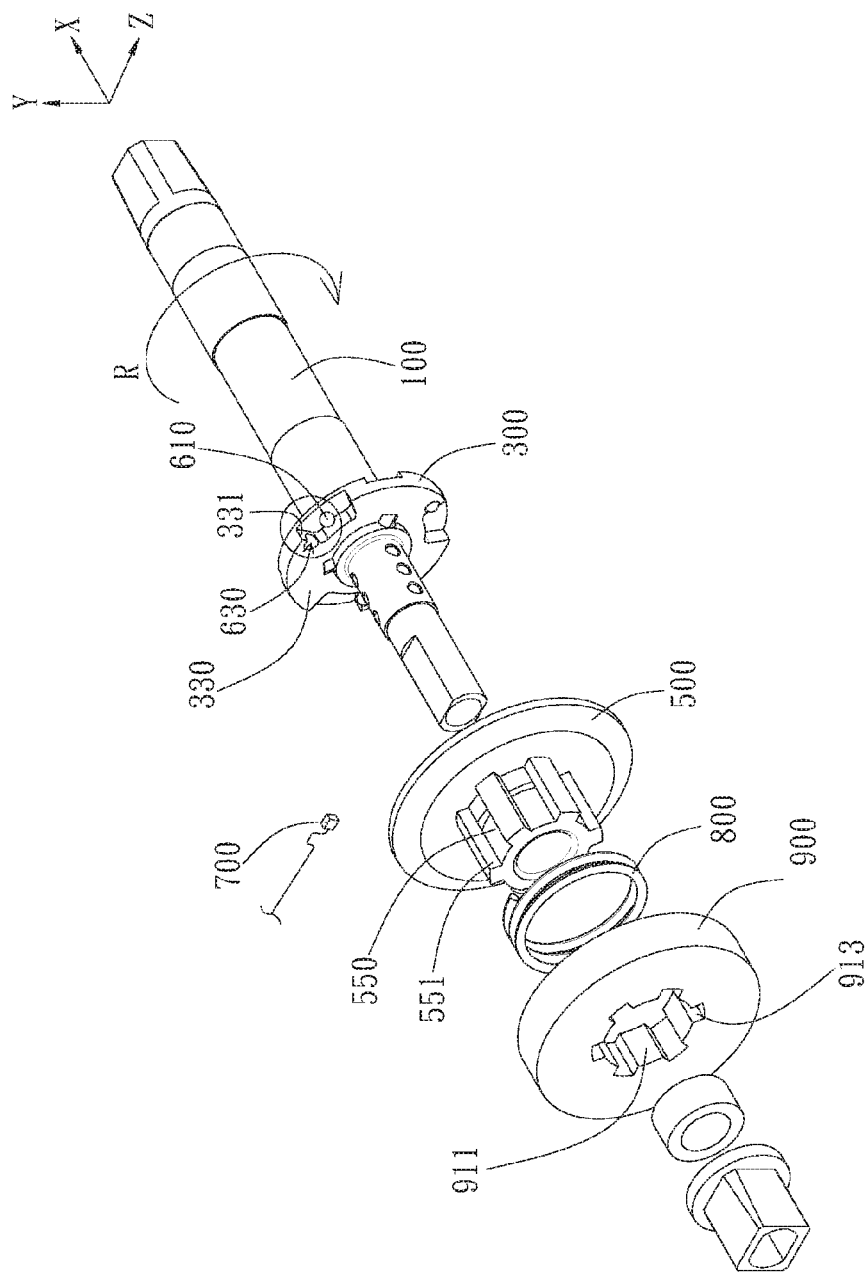
Figure 6C:
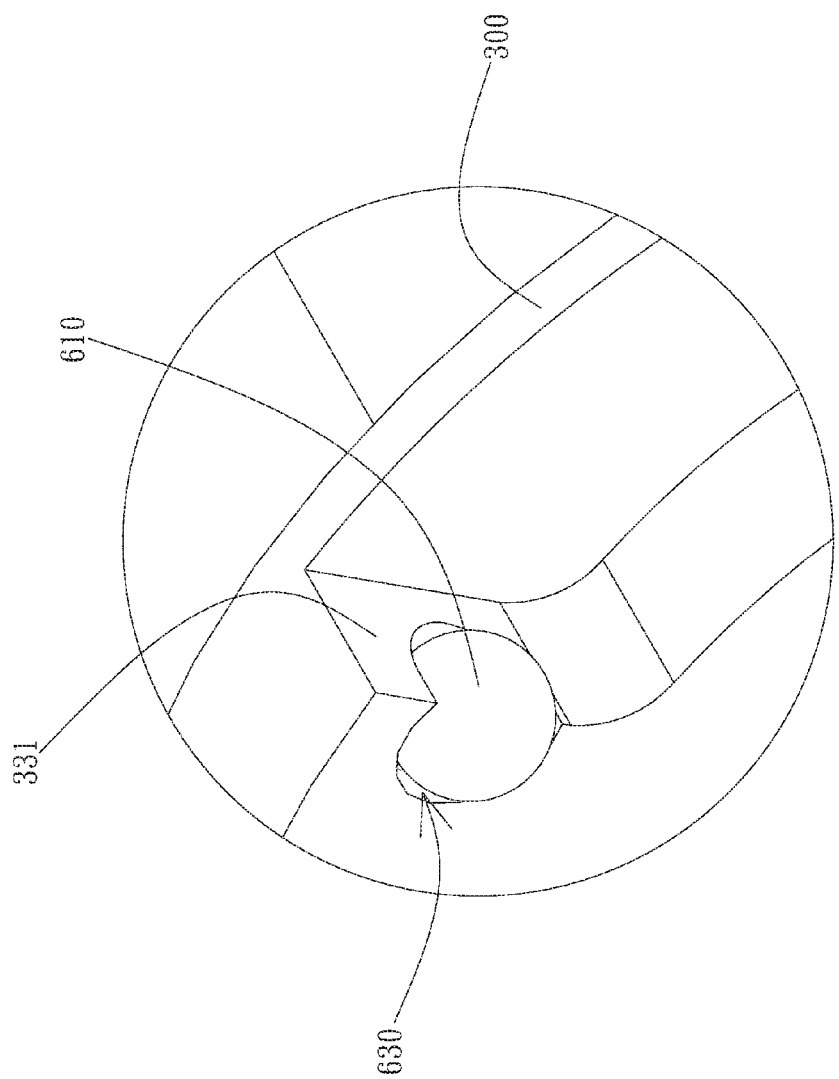
FIG. 6C is an enlarged view of a ball partially contained by a ball cavity in accordance with one embodiment of the present disclosure.

Another embodiment is described with reference to FIGS. 6A and 6B. In this embodiment, a ball 610 is disposed between the propelling surface 331 and the driven surface 531, so that the propelling surface 331 and the driven surface 531 are indirectly touch against with each other via the ball 610. More specifically, a cavity 630 is formed on the propelling surface 331, and the ball 610 is partially contained in the cavity 630 and is rollable within the cavity 630. As illustrated in FIG. 6C, a portion of the ball 610 protruding out from the cavity 630 touches against the driven surface 531. In this embodiment, the driven surface 531 is tilted relative to the virtual cross section perpendicular to the shaft 100, and that is, the driven surface 531 crosses through the plane formed by Y axis and Z axis. In a different embodiment, a contrary configuration may be adopted, such as disposing the cavity 630 on the driven surface 531 to contain the ball 610 and disposing the propelling surface 331 in a tilted manner. Through the ball 610, a relative sliding resistance generated between the propelling surface 331 and the driven surface 531 can be reduced, so that the efficiency of power transmission can be increased.

Figure 7A:
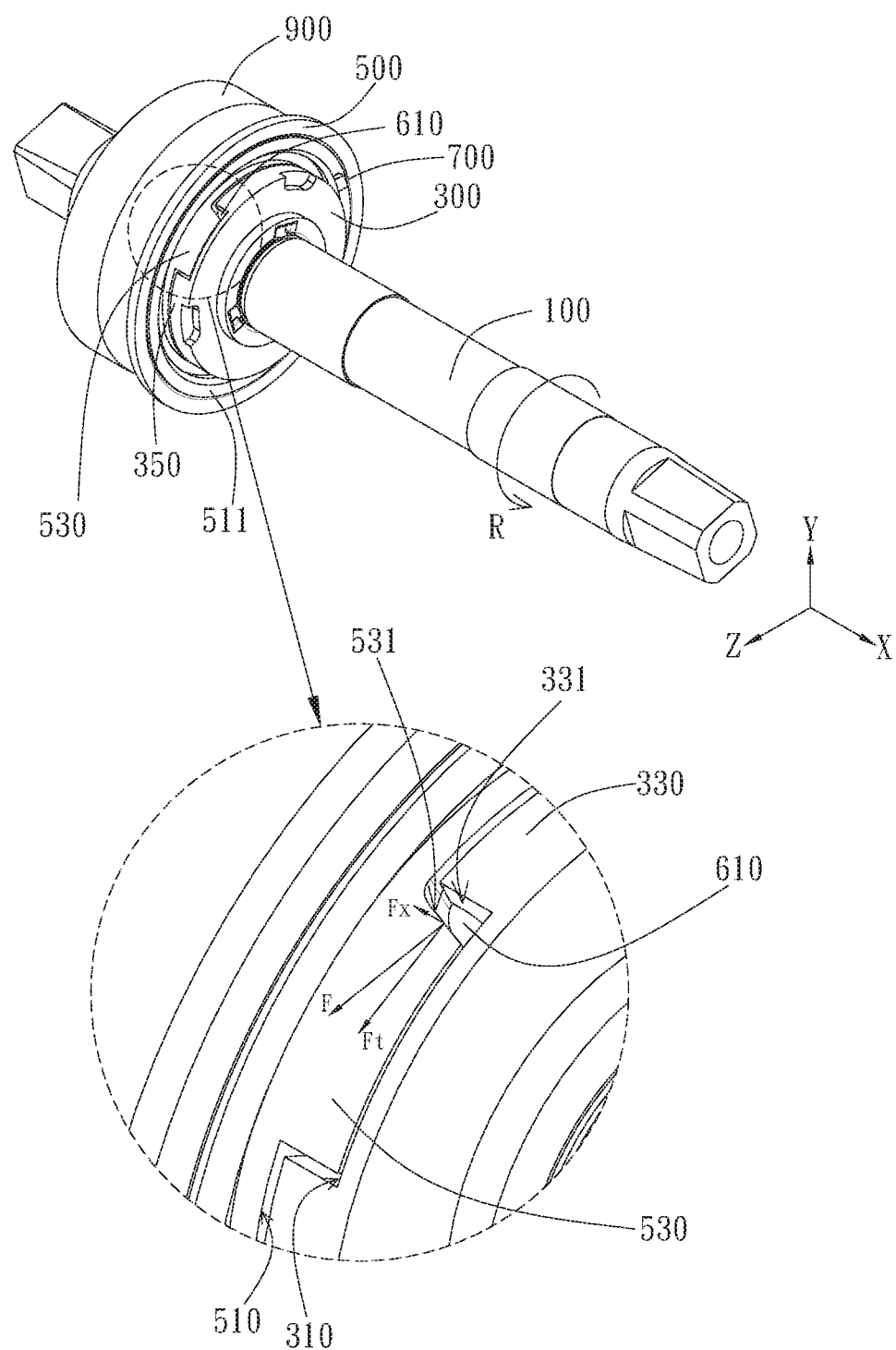
FIGS. 7A and 7B respectively illustrate the power transmission apparatus before the shaft drives the propelling plate to rotate and after the shaft drives the propelling plate to rotate in accordance with one embodiment of the present disclosure.

As illustrated in FIG. 7A, when the rider does not drive the pedals 102 and the shaft 100 does not drive the propelling plate 300 to rotate, the first block 300 inserts into a gap between two adjacent second blocks 530 more, and the propelling surface 331 and the driven surface 531 touch each other via the ball 610. At this time, due to the fact that the ball 610 is clamped between the propelling surface 331 and the driven surface 531, a slit exists between the propelling surface 331 and the driven surface 531.

Figure 7B:
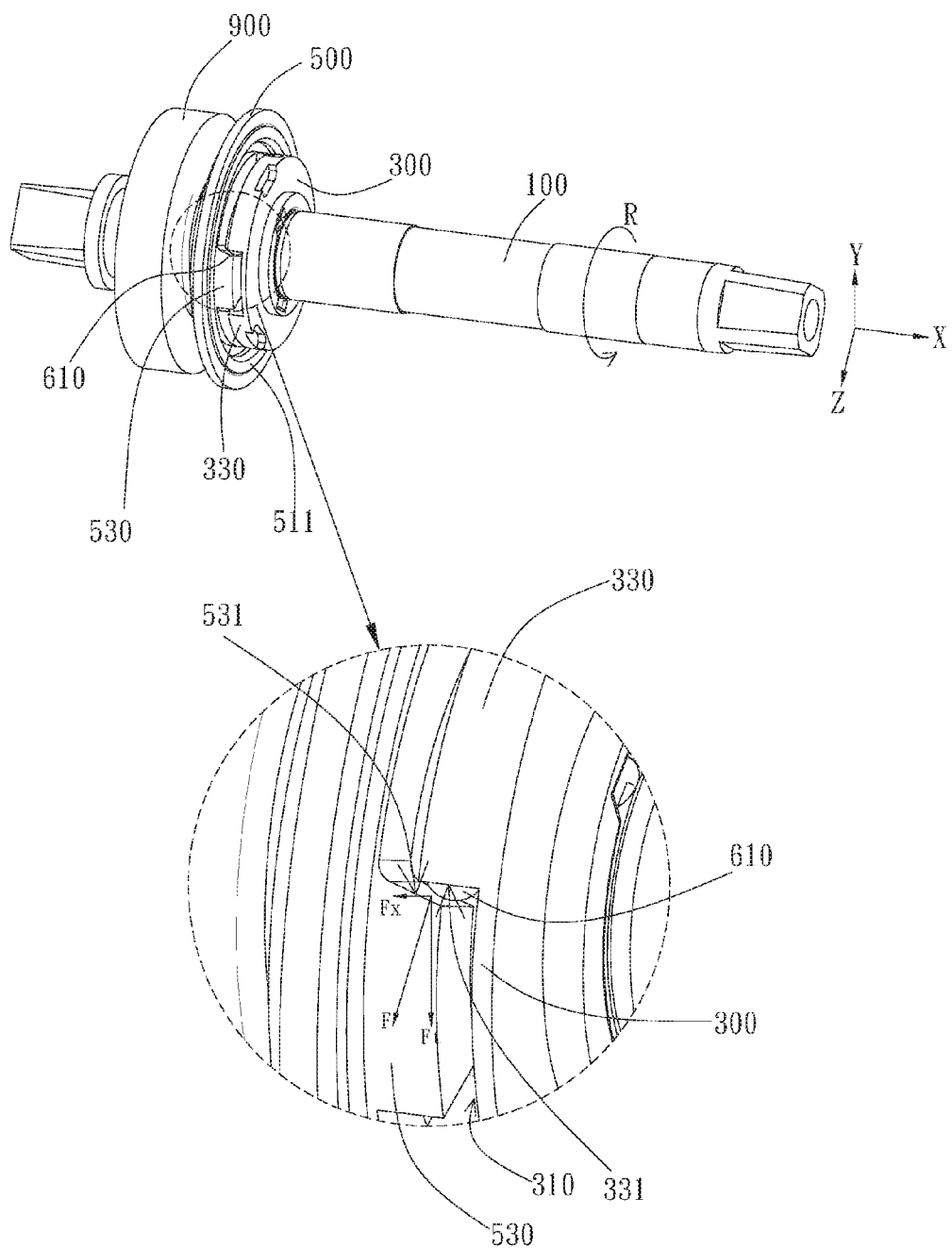

As illustrated in FIG. 7B, when the rider drives the pedals 102 and the shaft 100 drives the propelling plate 300 to rotate, the propelling surface 331 of the first block 330 compels the driven surface 531 of the second block 530 via the ball 610 to drive the first driven plate 500 to rotate correspondingly. When the ball 610 compresses the driven surface 531, an acting force F is applied to the driven surface 531. Since an included angle exists between a direction of the acting force F and a tangential direction of the rotation of the shaft 100, the acting force F has a force component Fx in the axial direction of the shaft 100 and a force component Ft in the tangential direction of the rotation of the shaft 100. The force component Fx is parallel to the X axis and can be regarded as a force component of the acting force F in the X axis. The force component Ft drives the second block 530 and the first driven plate 500 to rotate concurrently. The force component Fx drives the second block 530 and the first driven plate 500 to move along the X axis. When the driven surface 531 is driven by the force component Fx, the driven surface 531 drives the ball 610 to roll within the cavity 630. In such a configuration, a power loss caused by overcoming the friction between the propelling surface 331 and the driven surface 531 when the propelling surface 331 and the driven surface 531 move relatively can be reduced.

Another embodiment is described with reference to FIGS. 8A and 8B. In this embodiment, the protruding portion 551 on the tube portion 550 can be implemented by using balls 611. The tube portion 550 has an outer wall surface 553, the outer wall surface 553 forms ball cavities 555, and the balls 661 are partially contained in the ball cavities 555 and are rollable within the ball cavities 555. Portions of the balls 610 protruding out from the ball cavities 555 are contained within the guide grooves 913 and touch the bottoms surfaces 917 of the guide grooves 913. When the first driven plate 500 rotates, the portions of the balls 610 protruding out from the ball cavities 555 push side walls of the guide grooves 913 with the rotational direction of the first driven plate 500, to make the second driven plate 900 to rotate around the X axis. Concurrently, the balls 611 roll along the guide grooves 913 on the bottom surface 917 so as to allow the first driven plate 500 to move relative to the second driven plate 900 along the shaft 100 in the direction parallel to the X axis. In such a configuration, a friction between the tube portion 550 and the inner wall 911 of the second driven plate 900 can be reduced, so that the efficiency of power transmission can be increased.

In addition, in this embodiment, the shaft 100 has plurality of ball cavities 110 at a surface of a region of the shaft 100 inserting into the first driven plate 500, and the ball cavities 110 are arranged as multiple columns along the direction parallel to the X axis. Each of the ball cavities 110 is configured to contain a ball 111. The balls 111 are at least partially protruded from the ball cavities 110 and touch the inner wall of the hole 501 of the first driven plate 500, and all of the balls 111 are rollable within the ball cavities 110. When the first driven plate 500 moves relative to the shaft 100 along the shaft 100 and the direction parallel to the X axis, the inner wall of hole 501 of the first driven plate 500 drive the balls 111 to roll so as to reduce the friction and increase the efficiency of power transmission. Oil or other lubricating materials can be applied between the ball cavities 110, the balls 111, and other components that capable of moving relatively on a basis of actual requirements.

Figure 8A:
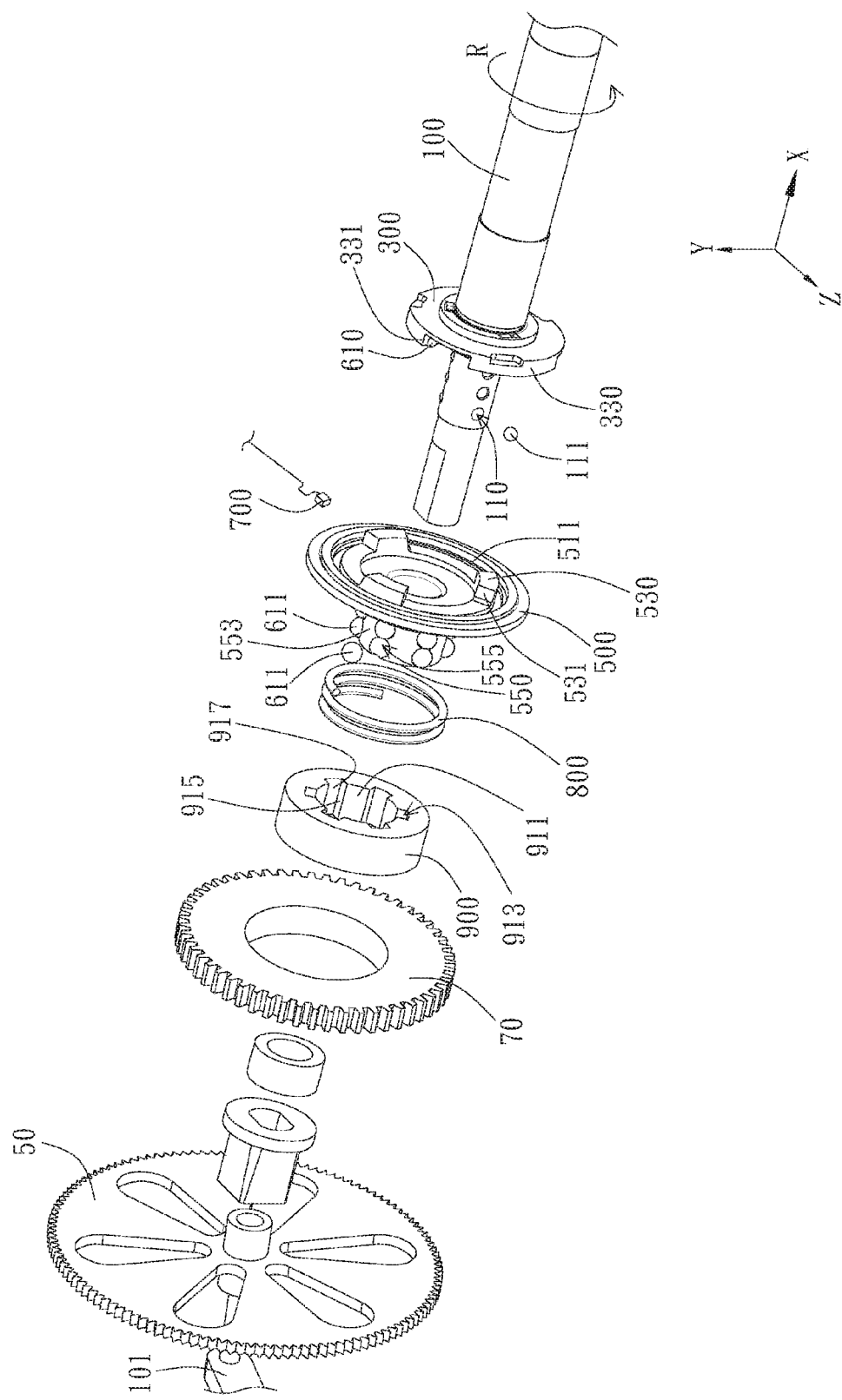
FIGS. 8A and 8B are exploded diagrams of a power transmission apparatus with balls in accordance with one embodiment of the present disclosure.
Figure 8B:
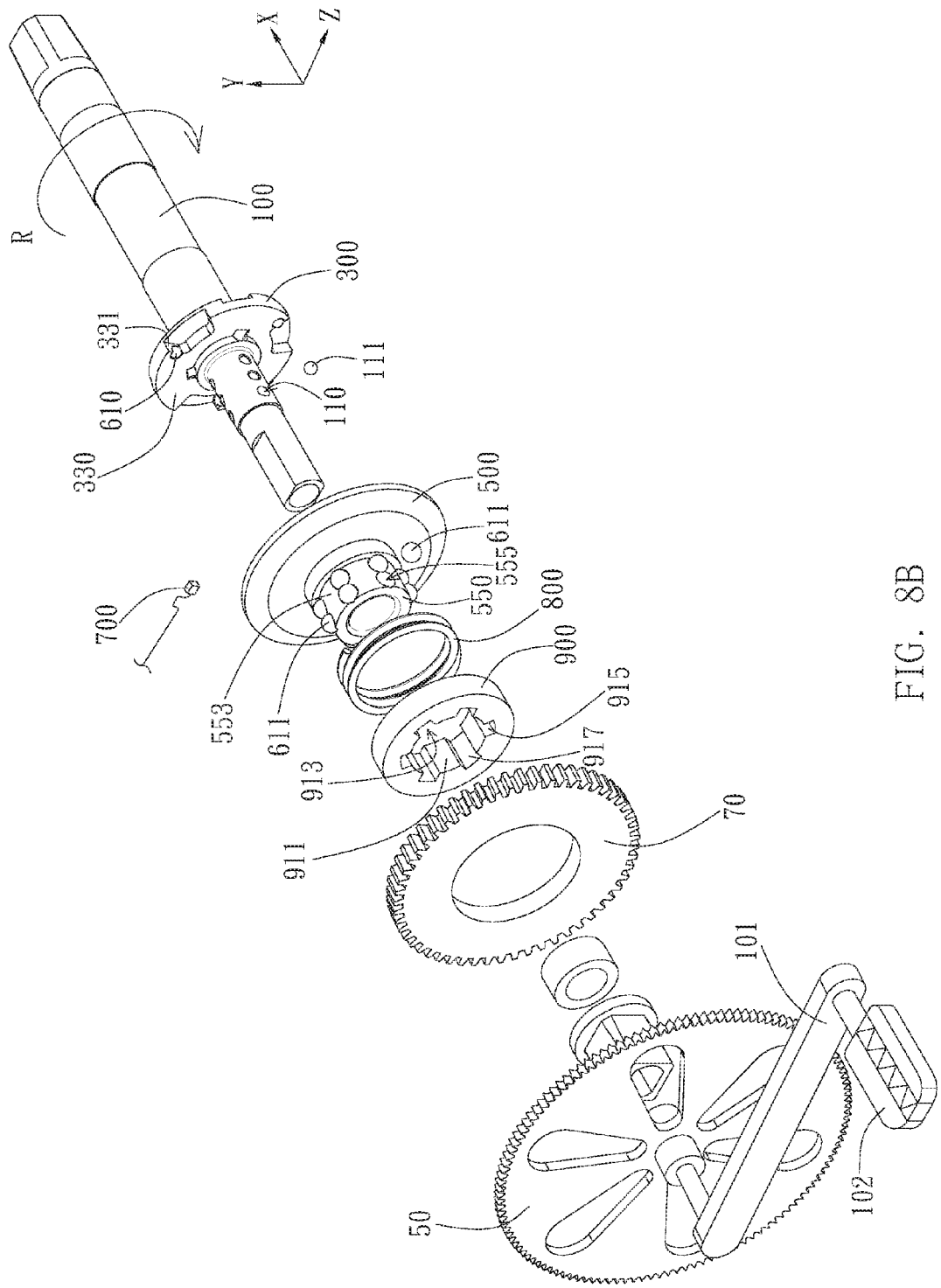

As illustrated in FIGS. 8A and 8B, an outer periphery of the second driven plate 900 can be coupled to a gear 70 directly or indirectly in power aspect, for example, outer periphery of the second driven plate 900 and the gear 70 can be engaged with each other via a clutch or a pawl. When the system senses that the torque on the shaft 100 is higher than a certain threshold, the power source can provide power to the second driven plate 900 via the gear 70, and further drive the wheels through the shaft 100 and the chainwheel 50.

Although the preferred embodiments of the present disclosure have been described herein, the above description is merely illustrative. The preferred embodiments disclosed will not limit the scope of the present disclosure. Further modification of the disclosure herein disclosed will occur to those skilled in the respective arts and all such modifications are deemed to be within the scope of the disclosure as defined by the appended claims.

What is claimed is:

1. A power transmission apparatus configured to drive a wheel of a vehicle, the power transmission apparatus comprising:
   a shaft extending along an axial direction;
   a propelling plate disposed on and rotating with the shaft, wherein the propelling plate has a first surface and at least one first block, the first block is disposed on the first surface, and the first block has a propelling surface;
   a first driven plate disposed on the shaft and capable of moving along the axial direction of the shaft, wherein the first driven plate has:
   a second surface opposite to the first surface; and
   at least one second block disposed on the second surface, wherein the second block has a driven surface, and the driven surface is at least partially opposite to the propelling surface;
   a sensor device disposed outside the shaft and close to the first driven plate, wherein the sensor device detects a distance between the sensor device and the second surface;
   a second driven plate disposed on the shaft and at a side of the first driven plate opposite to the propelling plate, wherein the second driven plate is fixed relative to the shaft in the axial direction of the shaft, and coupled to the wheel, when driven by the first driven plate, the second driven plate rotates around the shaft; and
   a resilient member disposed between the first driven plate and the second driven plate and being compressed to provide a restoring force to move the first driven plate toward the propelling plate;
   wherein when the propelling plate does not rotate around the axial direction of the shaft, the restoring force compels the first driven plate to move toward the propelling plate along the axial direction of the shaft to reveal a first distance between the sensor device and the second surface;

wherein when the propelling plate rotates around the axial direction of the shaft, the propelling surface compels the driven surface to make the first driven plate correspondingly rotate and simultaneously move away from the propelling plate along the axial direction of the shaft to reveal a second distance between the sensor device and the second surface, the first distance is different from the second distance, the second driven plate driven by the first driven plate so that the second driven plate rotates to drive the wheel.

2. The power transmission apparatus of claim 1, wherein the propelling surface and the driven surface cross a rotational direction of the shaft, and at least one of the propelling surface and the driven surface are tilted relative to a virtual cross section perpendicular to the shaft, wherein an interaction force generated by a contact between the propelling surface and the driven surface has force components both on a tangential direction of a rotation of the shaft and the axial direction of the shaft.

3. The power transmission apparatus of claim 1, wherein a ball is disposed between the propelling surface and the driven surface, one of the propelling surface and the driven surface comprises a cavity, the cavity partially contains the ball, and the other one of the propelling surface and the driven surface touches against a portion of the ball protruding out from the cavity.

4. The power transmission apparatus of claim 1, wherein a plurality of the second blocks are disposed on the second surface and concentrically distributed relative to the shaft, and the first block is inserted between two adjacent one of the plurality of the second blocks.

5. The power transmission apparatus of claim 1, wherein the first driven plate further has a magnetic region disposed on the second surface, the sensor device includes a magnetic sensor disposed corresponding to the magnetic region to detect a variation of a magnetic force of the magnetic region before and after the second surface moves.

6. The power transmission apparatus of claim 5, wherein the magnetic region is distributed with a ring shape surrounding the shaft, the radius of the ring shape is substantially r, and the center of the ring shape is substantially the shaft, the magnetic sensor is positioned at the distance r away from the shaft, and capable of continuously or periodically detecting a variation of an intensity of a magnetic field caused by the magnetic region when the first driven plate rotates around the axial direction of the shaft.

7. The power transmission apparatus of claim 1, wherein the first driven plate has a tube portion extending out toward the second driven plate, the tube portion has at least one protruding portion thereon, the second driven plate is at least partially disposed on the tube portion; wherein the second driven plate has an inner wall, the inner wall has a guide groove extended along the axial direction of the shaft, and the protruding portion is movably contained in the guide groove and movable along the guide groove.

8. The power transmission apparatus of claim 7, wherein the protruding portion has a ball, the tube portion has an outer wall, the outer wall forms a ball cavity, and the ball cavity partially contains the ball; when the first driven plate rotates, a portion of the ball protruding out from the ball cavity drives side walls of the guide groove to compel the second driven plate to rotate correspondingly, and the ball simultaneously rolls along the guide groove to allow the first driven plate to move relative to the second driven plate along the shaft.

9. The power transmission apparatus of claim 1, wherein the shaft comprises a plurality of ball cavities at a surface of a region of the shaft disposed by the first driven plate, the shaft has a plurality of balls, and the balls are respectively and rollably contained in the ball cavities; each of the balls at least partially protrudes out from the ball cavities and touches against an inner wall of a portion of the first driven plate disposed on the shaft.

10. A vehicle comprises the power transmission apparatus of claim 1.

11. The vehicle of the claim 10, wherein the propelling surface and the driven surface cross a rotational direction of the shaft, and at least one of the propelling surface and the driven surface are tilted relative to a virtual cross section perpendicular to the shaft.

12. The vehicle of the claim 10, wherein the first driven plate further has a magnetic region, the magnetic region is disposed on the second surface, the sensor device includes a magnetic sensor disposed corresponding to the magnetic region to detect a variation of a magnetic force of the magnetic region before and after the second surface moves.

13. A power transmission apparatus configured to drive a wheel, the power transmission apparatus comprising:
a shaft, wherein an axial direction of the shaft is extended along an X axis, and the shaft is capable of rotating around the X axis;
a propelling plate disposed on the shaft, capable of rotating around the X axis with the rotating of the shaft, wherein the propelling plate has a first surface and at least one first block, the first block is disposed on the first surface, the first surface is parallel to a plane formed by a Y axis and a Z axis, the X axis, the Y axis, and the Z axis are perpendicular to each other, and the first block has a propelling surface;
a first driven plate disposed on the shaft, the first driven plate capable of moving along the X axis relative to the shaft; wherein the first driven plate has a second surface and at least one second block, the second block is disposed on the second surface, the second surface is parallel to the plane formed by the Y axis and the Z axis, the second surface is opposite to the first surface, the second block has a driven surface, and the driven surface at least partially touches against the propelling surface;
a sensor device disposed close to the first driven plate, wherein the sensor device detects a moving distance of the first driven plate along the direction of the X axis;
a second driven plate disposed on the shaft and at a side of the first driven plate opposite to the propelling plate and driven to rotate by the first driven plate, wherein the second driven plate is fixed relative to the shaft in the direction of the X axis, and coupled to the wheel; and
a resilient member disposed between the first driven plate and the second driven plate; wherein when the first driven plate moves toward the second driven plate along the direction of the X axis, the resilient member is compressed to provide the first driven plate a restoring force toward the propelling plate on the direction of the X axis;
wherein when the shaft does not rotate together with the propelling plate, the restoring force compels the first driven plate to touch against the propelling plate to reveal a first distance between the sensor device and the first driven plate;
when the shaft rotates together with the propelling plate, the propelling surface compels the driven surface to correspondingly rotate, an interaction force generated by a contact between the propelling surface and the driven surface has an X axis force component on the direction of the X axis, the X axis force component overcome the restoring force, so as to compel the first driven plate to move away from the propelling plate toward the second driven plate along the direction of the X axis to reveal a second distance between the sensor device and the first driven plate, the first distance is different from the second distance, the second driven plate is driven to rotate by the first driven plate, and the second driven plate rotates to drive the wheel to rotate.

14. The power transmission apparatus of claim 13, wherein the propelling plate further has a plurality of the first block, the plurality of the first block are arranged on the first surface with a ring shape centered at the shaft, the first driven plate further has a plurality of the second blocks, the plurality of the second block are arranged on the second surface with a ring shape centered at the shaft, each of the first blocks is inserted between two adjacent one of the plurality of the second blocks.

15. The power transmission apparatus of claim 13, wherein the propelling surface and the driven surface obliquely pass through the plane formed by the Y axis and the Z axis, so that when propelling plate rotates together with the shaft, the interaction force generated by the contact between the propelling surface and the driven surface has the X axis force component on the direction of the X axis.

16. The power transmission apparatus of claim 13, wherein the first driven plate further has a ring-distributed magnetic region, the ring-distributed magnetic region is disposed on a surface of the first driven plate, the sensor device includes a magnetic sensor close to the magnetic region to detect a variation of a magnetic force of the magnetic region before and after the first driven plate moves along the X axis.

17. The power transmission apparatus of claim 13, wherein a ball is disposed between the propelling surface and the driven surface, one of the propelling surface and the driven surface forms a cavity, the cavity partially contains the ball, and the other one of the propelling surface and the driven surface touches against a portion of the ball protruding out from the cavity.

18. The power transmission apparatus of claim 13, wherein the first driven plate has a tube portion extending out toward the second driven plate, the tube portion has at least one protruding portion thereon, the second driven plate is at least partially disposed on the tube portion; wherein the second driven plate has an inner wall, the inner wall has a guide groove extended along the X axis, and the protruding portion is movably contained in the guide groove and movable along the guide groove.

19. The power transmission apparatus of claim 18, wherein the protruding portion has a ball, the tube portion has an outer wall, the outer wall forms a ball cavity, and the ball cavity partially contains the ball; when the first driven plate rotates, a portion of the ball protruding out from the ball cavity pushes side walls of the guide groove to compels the second driven plate to rotate correspondingly, and the ball simultaneously rolls along the guide groove on the direction of the X axis to allow the first driven plate to move relative to the second driven plate on the direction of the X axis.

20. The power transmission apparatus of claim 13, wherein the shaft forms a plurality of ball cavities at a surface of a region of the shaft disposed by the first driven plate, the shaft has a plurality of balls, and the balls are respectively and rollably contained in the ball cavities; each of the balls at least partially protrudes out from the ball cavities, and touches against an inner wall of a portion of the first driven plate disposed on the shaft.

* * * * *